United States Patent
Kulesha (10) Patent No.: US 10,538,037 B2
(45) Date of Patent: Jan. 21, 2020

(54) APPARATUS FOR BONDING LAMINATE STRUCTURES

(71) Applicant: The Boeing Company, Chicago, IL (US)

(72) Inventor: Richard L. Kulesha, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 15/437,680

(22) Filed: Feb. 21, 2017

(65) Prior Publication Data

US 2017/0165900 A1 Jun. 15, 2017

Related U.S. Application Data

(62) Division of application No. 14/335,426, filed on Jul. 18, 2014, now Pat. No. 9,610,728.

(51) Int. Cl.
*B32B 7/08* (2019.01)
*B60J 10/00* (2016.01)
(Continued)

(52) U.S. Cl.
CPC .............. *B29C 65/562* (2013.01); *B25C 5/00* (2013.01); *B25C 5/06* (2013.01); *B25C 5/11* (2013.01);
(Continued)

(58) Field of Classification Search
CPC ......... B29C 65/02; B29C 65/18; B29C 65/34; B29C 65/3404; B29C 65/3444;
(Continued)

(56) References Cited

U.S. PATENT DOCUMENTS 2,370,745 A 3/1945 Monroe
3,916,147 A * 10/1975 Mercer .................. B29C 65/44
219/233

(Continued)

FOREIGN PATENT DOCUMENTS

CA 2070830 A1 6/1991
FR 2998210 A1 5/2014
(Continued)

OTHER PUBLICATIONS

International Search Report for related European International Application No. EP15176478; report dated Jun. 15, 2016.
(Continued)

*Primary Examiner* — Philip C Tucker
*Assistant Examiner* — Brian R Slawski
(74) *Attorney, Agent, or Firm* — Miller, Matthias & Hull LLP (57) ABSTRACT

A composite laminate reinforcing tool may be used to form a reinforced joint at a bond line of a composite laminate structure. The tool may hold one or more clips having posts, and the tool may be positioned along the bond line between at least two composite laminate elements. Joint sections of the clip may be heated to increase a pliability of the joint section, and the tool may be actuated to drive the post through the at least two composite laminate elements. The posts may be deflected toward a base of the clip, thereby to seat the clip. The reinforced composite laminate structure may then be cured.

20 Claims, 3 Drawing Sheets

(51) Int. Cl.

| | | |
|---|---|---|
| *A61F 13/15* | (2006.01) | |
| *B29C 65/00* | (2006.01) | |
| *B32B 37/00* | (2006.01) | |
| *C08J 5/00* | (2006.01) | |
| *B65C 3/20* | (2006.01) | |
| *B30B 5/02* | (2006.01) | |
| *B30B 5/04* | (2006.01) | |
| *B30B 15/34* | (2006.01) | |
| *B29C 65/56* | (2006.01) | |
| *B29C 65/18* | (2006.01) | |
| *B29C 70/54* | (2006.01) | |
| *B29C 65/60* | (2006.01) | |
| *B29C 70/24* | (2006.01) | |
| *B25C 5/00* | (2006.01) | |
| *B25C 5/11* | (2006.01) | |
| *B29C 65/02* | (2006.01) | |
| *B25C 5/06* | (2006.01) | |

(52) U.S. Cl.
CPC .............. *B29C 65/02* (2013.01); *B29C 65/18* (2013.01); *B29C 65/601* (2013.01); *B29C 66/1122* (2013.01); *B29C 66/472* (2013.01); *B29C 66/721* (2013.01); *B29C 66/742* (2013.01); *B29C 66/828* (2013.01); *B29C 66/8227* (2013.01); *B29C 66/8322* (2013.01); *B29C 66/861* (2013.01); *B29C 70/24* (2013.01); *B29C 70/543* (2013.01); *B29C 66/71* (2013.01); *B29C 66/725* (2013.01); *B29C 66/727* (2013.01); *B29C 66/7212* (2013.01); *B29C 66/7394* (2013.01); *B29C 66/73751* (2013.01); *B29C 66/7487* (2013.01); *Y02T 50/43* (2013.01)

(58) Field of Classification Search
CPC ... B29C 65/3464; B29C 65/56; B29C 65/562; B29C 65/60; B29C 65/601; B29C 65/72; B29C 66/1122; B29C 66/472; B29C 66/721; B29C 66/8322; B29C 66/861; Y10T 428/249923; Y10T 428/24174
USPC ..... 156/60, 91, 92, 196, 221, 226, 227, 228, 156/242, 245, 290, 291, 297, 298, 303.1, 156/308.2, 309.6, 309.9, 349, 391, 443, 156/475, 476, 492, 579, 580, 581, 583.1, 156/583.6, 583.7, 583.8, 583.9; D8/49, D8/50, 389, 390
See application file for complete search history.

(56) References Cited

U.S. PATENT DOCUMENTS

| | | | |
|---|---|---|---|
| 3,925,955 A * | 12/1975 | Becht | F16B 15/0015 |
| | | | 411/472 |
| 4,262,836 A | 4/1981 | Hirose | |
| 4,281,785 A * | 8/1981 | Brooks | B25C 5/02 |
| | | | 156/311 |
| 4,550,870 A | 11/1985 | Krumme et al. | |
| 4,582,236 A | 4/1986 | Hirose | |
| 5,876,540 A | 3/1999 | Pannell | |
| 7,021,512 B1 * | 4/2006 | Nakamura | B25C 5/00 |
| | | | 227/120 |
| 2003/0190455 A1 | 10/2003 | Burgess et al. | |
| 2008/0145177 A1 | 6/2008 | Kulesha | |
| 2008/0295334 A1 | 12/2008 | Kulesha | |
| 2012/0301702 A1* | 11/2012 | Nishimura | B29C 73/04 |
| | | | 428/223 |
| 2013/0276310 A1 | 10/2013 | Kulesha | |
| 2015/0053328 A1* | 2/2015 | Wang | B29C 65/3468 |
| | | | 156/92 |
| 2015/0290903 A1 | 10/2015 | Tresse | |
| 2015/0336329 A1* | 11/2015 | Lehmann | B29B 11/16 |
| | | | 156/73.1 |

FOREIGN PATENT DOCUMENTS

| | | |
|---|---|---|
| GB | 2238977 A | 6/1991 |
| WO | 9108892 A1 | 6/1991 |
| WO | 9942253 A1 | 8/1999 |
| WO | 2006001860 A2 | 1/2006 |

OTHER PUBLICATIONS

International Search Report for related European International Application No. EP15176478; report dated Jan. 12, 2016.
Office Action for Related Chinese Patent Application No. 201510428923.1; Report dated Dec. 25, 2017.
Office Action for related Chinese Application No. 2015038003; report dated Feb. 4, 2019.

\* cited by examiner

APPARATUS FOR BONDING LAMINATE STRUCTURES

FIELD

The present disclosure relates generally to fabrication of composite laminate structures, such as aircraft subassemblies, and more particularly to methods and apparatus for bonding laminates of a composite laminate structure.

BACKGROUND

Composite laminate structures are used extensively in the transportation industry for their lightweight and load bearing performance. As used herein, the transportation industry may include aerospace, marine, rail, and land-based vehicular applications. An aircraft, for example, may include stringers in an aircraft wing, stiffeners, and spar structures that are all formed of composite laminate structures.

A composite laminate structure may include a skin and a core. The core may be formed of end-grain balsa wood, a honeycomb of metallic foil or aramid paper, or of a wide variety of urethane, PVC, or phenolic foams, or the like. The skin may be constructed of multiple layers or laminates of a polymer matrix fiber composite, such as carbon fiber reinforced plastics (CFRP). Elements of the composite laminate structure may be bonded together, such as with an adhesive.

Typical failures in laminate structure can result from core failure under compressive forces or in shear or, more commonly, from a failure of the bond or adhesive capability between the core and the composite laminate skin, or between layers of the laminate skin. Other failures, depending on loading may include crimpling of one or both skins, bending failure of the laminate structure, or failure of the edge attachment means from which certain loads are transferred to the laminate structure.

Because of the failure modes noted above, reinforcements have been proposed that extend out-of-plane or normal to the planes of the skins. This is sometimes called the "Z" direction, as it is common to refer to the coordinates of the laminate skins as falling in a plane that includes the X and Y coordinates. Thus the X and Y coordinates are sometimes referred to as two-dimensional composite or 2-D composite. This is especially appropriate as the skins are often formed of fiber fabrics that are stitched or woven and stacked on top of each other to form plies or layers of a composite.

Conventional bonding methods are inadequate for certain types of laminates, may not significantly reinforce the laminates, and/or are overly burdensome to use during construction of the composite laminate structure. For example, Z-pinning has been proposed in which carbon pins are inserted at angles to fasten flanges of joined laminates. During this process, the ends of the pins protruding from the top surface of the laminate skin must be removed, which may weaken the pins due to micro-cracking. Additionally, the pins provide negligible, if any, reinforcement of the laminates. Another proposed approach is stitching the laminates together to bond them together and provide reinforcement. Stitching, however, cannot be performed on pre-impregnated laminates, as the impregnated resin will clog the sewing mechanism used to insert the stitch.

Therefore, it would be advantageous to have a method and apparatus that takes into account one or more of the issues discussed above.

SUMMARY

In accordance with one aspect of the present disclosure, a composite laminate reinforcing system is provided for forming a reinforced joint at a bond line in a composite laminate structure comprising at least two composite laminate elements positioned over a backing surface. The system comprises a plurality of clips, each of the plurality of clips comprising a base and a first post coupled to the base at a first joint section between the first post and the base, the first post extending at an initial angle relative to the base and defining a first post outer surface, facing away from the base and comprising an inwardly tapered section at a tip of the first post. The system further comprises a tool comprising a tool base, a housing coupled to the tool base, the housing and tool base defining a chamber for receiving the plurality of clips, the chamber defining an outlet end, a guide assembly disposed in the chamber and configured to hold the plurality of clips in a predetermined orientation and to bias the plurality of clips toward the outlet end of the chamber, a plunger head disposed in the chamber adjacent the outlet end of the chamber, the plunger head positioned to engage the base of a leading clip of the plurality of clips, the plunger head being movable between a retracted position, in which the plunger head is disposed in the chamber, and an extended position, in which the plunger head passes through the chamber outlet end to dispense the leading clip, and a heating element thermally coupled to the plunger head and configured to heat the first joint section sufficiently above an ambient temperature to increase a pliability of the first joint section, wherein as the plunger head moves to the extended position so that the first post pierces through the at least two composite laminate elements, the inwardly tapered section of the first post outer surface engages the backing surface to deflect the first post toward the base at the first joint section until the first post extends at a first deflected angle relative to the base.

In accordance with another aspect of the present disclosure, a composite laminate reinforcing system is provided for forming a reinforced joint at a bond line in a composite laminate structure comprising at least two composite laminate elements positioned over a backing surface. The system comprises a plurality of clips, each of the plurality of clips comprising a base, a first post coupled to the base at a first joint section between the first post and the base, and a second post coupled to the base at a second joint section between the second post and the base, the first post and the second post extending at first and second initial angles, respectively, relative to the base, the first and second initial angles being approximately 90 degrees so that each of the plurality of clips has a U-shape, the first post defining a first post outer surface, facing away from the base and comprising an inwardly tapered section at a tip of the first post, and the second post defining a second post outer surface, facing away from the base and comprising an inwardly tapered section at a tip of the second post. The system further comprises a tool, comprising a tool base, a housing coupled to the tool base, the housing and tool base defining a chamber for receiving the plurality of clips, the chamber defining an outlet end, a guide assembly disposed in the chamber and configured to hold the plurality of clips in a predetermined orientation and to bias the plurality of clips toward the outlet end of the chamber, a plunger head disposed in the chamber adjacent the outlet end of the chamber, the plunger head positioned to engage the base of a leading clip of the plurality of clips, the plunger head being movable between a retracted position, in which the plunger head is disposed in the chamber, and an extended position, in which the plunger head passes through the outlet end of the chamber to dispense the leading clip, and a heating element thermally coupled to the plunger head and configured to heat the first and second joint sections sufficiently above an ambient temperature to increase a pliability of the first and second joint sections, wherein as the plunger head moves to the extended position so that the first and second posts pierce through the at least two composite laminate elements, the inwardly tapered sections of the first post outer surface and the second post outer surface engage the backing surface to deflect the first and second posts toward the base at the first and second joint sections, respectively, until the first and second posts extend at first and second deflected angles relative to the base.

In accordance with yet another aspect of the present disclosure, a clip is provided for reinforcing a joint along a bond line between at least two composite laminate elements positioned over a backing surface. The clip comprises a base, a first post coupled to the base at a first joint section between the first post and the base, the first post extending at a first initial angle relative to the base and defining a first post outer surface, facing away from the base and comprising an inwardly tapered section at a tip of the first post, and a second post coupled to the base at a second joint section between the second post and the base, the second post extending at a second initial angle relative to the base and defining a second post outer surface, facing away from the base and comprising an inwardly tapered section at a tip of the second post. The clip is formed of a clip material which, when heated sufficiently above an ambient temperature, increases pliability of the first and second joint sections so that forces engaging the inwardly tapered sections of the first and second posts deflect the first and second posts toward the base at the first and second joint sections, respectively, until the first and second posts extend at first and second deflected angles relative to the base.

In accordance with another aspect of the present disclosure that may be combined with any of the other aspects identified herein, the post of the clip may include an inner surface facing toward the base and an outer surface facing away from the base, and the outer surface may include a tapered section reducing a thickness at a tip of the post.

In accordance with another aspect of the present disclosure that may be combined with any of the other aspects identified herein, the clip may be formed of a clip material selected from a group of clip materials consisting of unidirectional fiber reinforced thermoplastic, non-oriented chopped fiber thermoplastic, and neat thermoplastic resin.

In accordance with another aspect of the present disclosure that may be combined with any of the other aspects identified herein, a plurality of clips may be loaded into the composite laminate reinforcing tool and driven into the bond line.

In accordance with another aspect of the present disclosure that may be combined with any of the other aspects identified herein, adjacent pairs of the plurality of clips may be coupled with a link.

In accordance with another aspect of the present disclosure that may be combined with any of the other aspects identified herein, the initial angle may be approximately 90 degrees.

In accordance with another aspect of the present disclosure that may be combined with any of the other aspects identified herein, the composite laminate reinforcing tool may include a plunger head positioned to engage a base of the clip, and the plunger head may be heated to heat the joint section.

In accordance with another aspect of the present disclosure that may be combined with any of the other aspects identified herein, the plunger head may be movable from a retracted position to an extended position, and actuating the composite laminate reinforcing tool may include actuating the plunger head from the retracted position to the extended position.

In accordance with another aspect of the present disclosure that may be combined with any of the other aspects identified herein, at least one of the at least two composite laminate elements may be a pre-impregnated laminate element.

In accordance with another aspect of the present disclosure that may be combined with any of the other aspects identified herein, after deflecting the post the seated clip and at least two composite laminate elements may be heated to cure the composite laminate structure.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
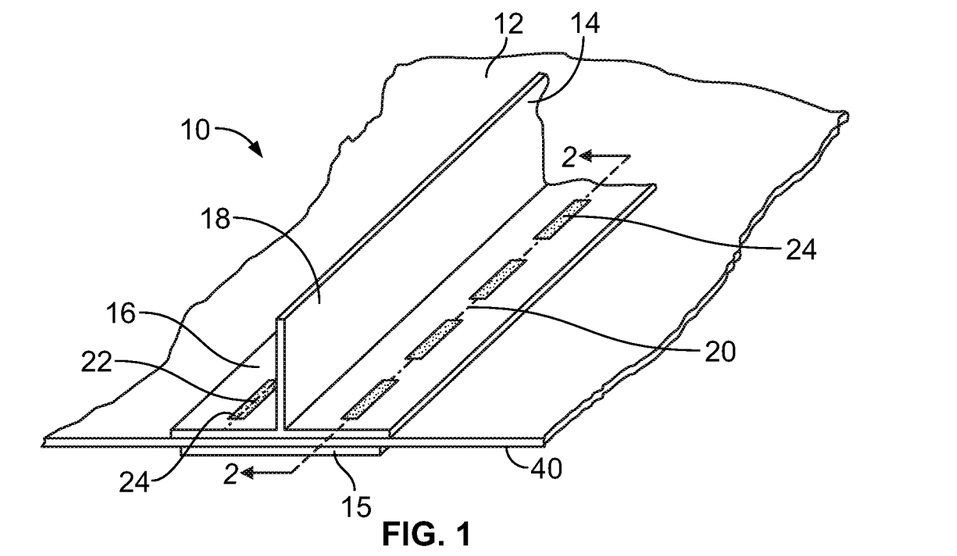
FIG. 1 is a perspective view of a composite laminate structure including reinforcing clips, in accordance with an advantageous embodiment.

Referring more particularly to the drawings, FIG. 1 illustrates a composite laminate structure 10 including a first composite laminate element 12 and a second composite laminate element 14. While the composite laminate structure 10 is shown having two elements 12, 14, it may include more than two elements. The first composite laminate element 12 is shown in the form of a laminate skin, while the second composite laminate element is shown in the form of a stringer having a base 16 and a flange 18. It will be appreciated, however, that the first and second composite laminate elements 12, 14 may take the form of other components generally known in the relevant art. For example, the two elements may be: both skin elements; layers of an integral skin element; a skin element and a support element; or both support elements. In the aircraft art, exemplary composite laminate structures include a skin joined to a longeron, bulkhead, stringer, frame or other structure, as well as skin joined to another skin.

The first and second composite laminate elements 12, 14 are shown as being bonded together along first and second bond lines 20, 22. The number and location of the bond lines may be determined based on the type of composite laminate structure to be formed, the expected loading of the composite laminate structure, the application in which the composite laminate structure may be used, and other considerations. Accordingly, the number and orientation of the bond lines may be different than those shown in FIG. 1.

Figure 2:
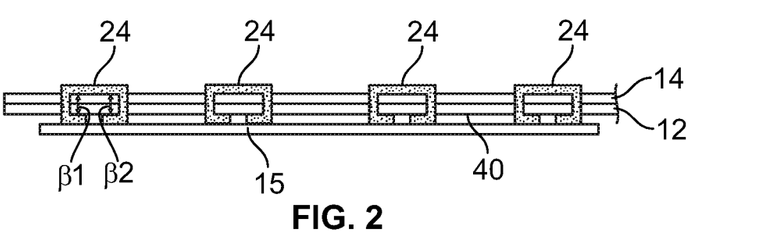
FIG. 2 is a side elevation view, in cross-section, of a composite laminate structure, taken along line 2-2 of FIG. 1.
Figure 3:
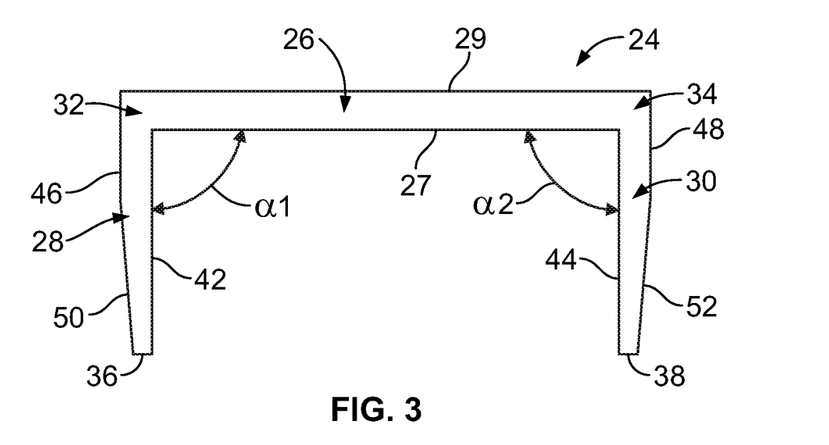
FIG. 3 is an enlarged side elevation view of a reinforcing clip, in accordance with an advantageous embodiment.

As best shown with reference to FIGS. 1-3, the composite laminate elements 12, 14 are joined together by a plurality of reinforcing clips 24 oriented along the bond lines 20, 22. Each clip 24 may include a base 26 and two posts 28, 30 extending from opposite ends of the base 26. The regions in which the posts 28, 30 are coupled to the base 26 are defined herein as joint sections 32, 34. In FIG. 2, the posts 28, 30 are shown piercing through both the first and second composite laminate elements 12, 14 and deflecting inwardly toward the base 26 so that respective tips 36, 38 of the posts 28, 30 engage a bottom surface 40 of the first composite laminate element 12. When positioned as shown in FIG. 2, the clips 24 are referred to herein as being "seated" or in a "seated configuration."

Prior to being seated, the clips 24 may have an initial configuration, as shown in FIG. 3, to facilitate attachment of the clips 24 to the first and second composite laminate elements 12, 14. FIG. 3 more clearly illustrates the parts of the clip 24, including the base 26, posts 28, 30, joint sections 32, 34, and tips 36, 38. In the initial configuration, the posts 28, 30 may extend at initial angles $\alpha 1$, $\alpha 2$ relative to the base 26. In the illustrated embodiment, the initial angles $\alpha 1$, $\alpha 2$ are approximately ninety degrees to give the clip 24 a U-shape, however other angles may be used.

Additionally, in FIG. 3 the posts 28, 30 are shown as having inner surfaces 42, 44 generally facing the base 26 and outer surfaces 46, 48 generally facing away from the base 26. Each of the outer surfaces 46, 48 may include a tapered section 50, 52 which reduces a thickness of the posts 28, 30 at the tips 36, 38. The tapered sections 50, 52 may facilitate inward deflection of the posts 28, 30 during seating of the clip 24, as will be understood more fully below.

The clips 24 may be formed of a material suitable for use in a composite laminate structure. For aircraft applications, the clip material may have a high strength-to-weight ratio, and may react favorably to heat that may be generated during subsequent curing procedures, if needed. Exemplary clip materials include uni-directional fiber reinforced thermoplastic, non-oriented chopped fiber thermoplastic, and neat thermoplastic resin. In materials using fibers, the fibers may be graphite fibers, aramid fibers, or the like. These materials are merely exemplary, as nearly any material may be used that is capable of being formed into a clip and has advantageous non-corrosive characteristics.

Figure 4:
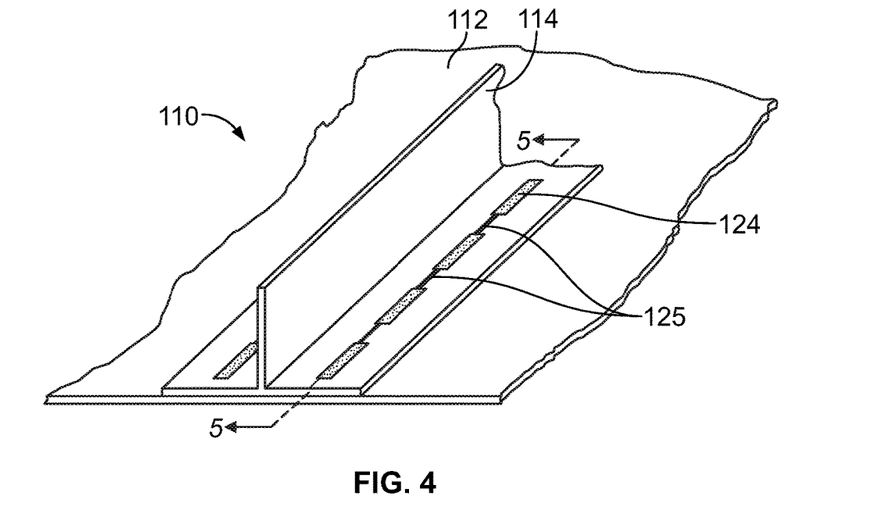
FIG. 4 is a perspective view of a composite laminate structure including linked reinforcing clips, in accordance with an advantageous embodiment.
Figure 5:
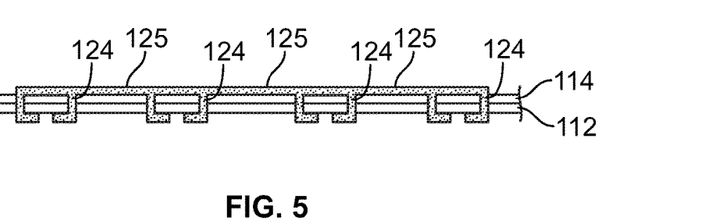
FIG. 5 is a side elevation view, in cross-section, of a composite laminate structure taken along line 5-5 of FIG. 4.

An alternative embodiment of a composite laminate structure 110 is illustrated in FIGS. 4 and 5. Similar to the embodiment of FIGS. 1 and 2, the composite laminate structure 110 includes a first composite laminate element 112 and a second composite laminate element 114 joined by a plurality of clips 124. In this embodiment, however, the clips 124 are coupled to each other by links 125 extending between adjacent pairs of clips 124. The links 125 may be formed of the same material as the clips 124, examples of which are identified above.

Figure 6:
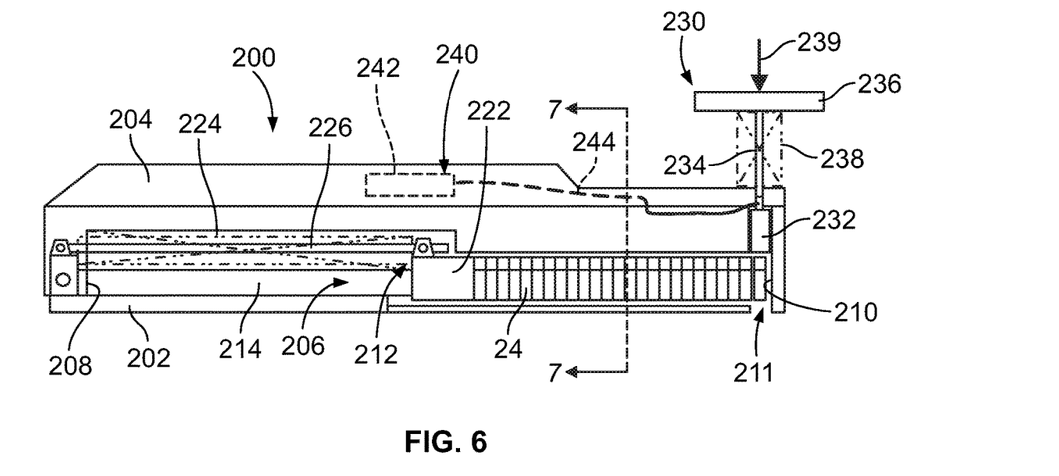
FIG. 6 is a side elevation view, in cross-section, of a composite laminate reinforcing tool in accordance with an advantageous embodiment.
Figure 7:
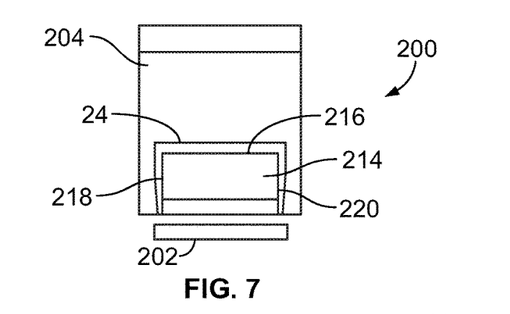
FIG. 7 is an end view of the composite laminate reinforcing tool of FIG. 6.
Figure 8:
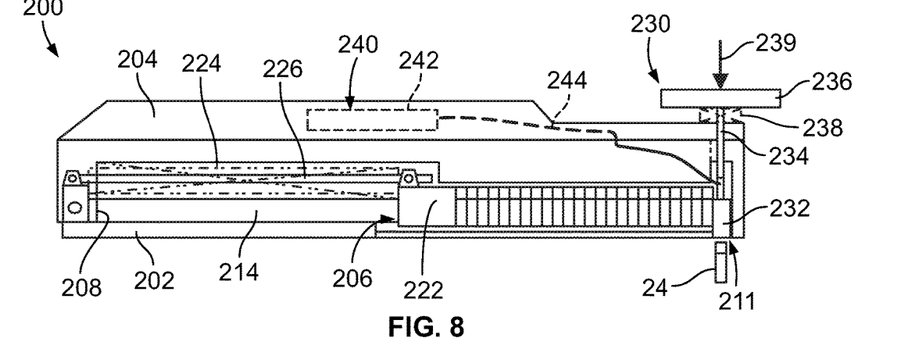
FIG. 8 is a side elevation view, in cross-section, of the composite laminate reinforcing tool of FIG. 6, with a plunger head in an extended position.

A composite laminate reinforcing tool 200 may be used to insert the clips 24 through the first and second composite laminate elements 12, 14 and seat the clips 24. An exemplary tool 200 is illustrated in FIGS. 6-8 as including a base 202 pivotably coupled to a housing 204. The base 202 and housing 204 define a chamber 206 sized to receive a plurality of clips 24. The chamber 206 includes a base end 208 and an outlet end 210 defining an outlet 211, through which clips 24 may be dispensed from the tool 200.

The composite laminate reinforcing tool 200 may further include a guide assembly 212 disposed in the chamber 206 that is configured to hold one or more clips 24 in a pre-determined orientation and to bias the one or more clips 24 toward the chamber outlet end 210. In the illustrated embodiment, the guide assembly 212 includes a slide 214 disposed in the chamber 206 and configured to receive a plurality of clips 24 in the pre-determined orientation. More specifically, and as best seen in FIG. 7, the slide 214 has a rectangular cross-section that is generally complementary to the U-shaped clips 24. A top surface 216 of the slide 214 supports a bottom surface 27 of the clip base 26, and the posts 28, 30 of the clips 24 depend downwardly on opposite side surfaces 218, 220 of the slide 214. Accordingly, the slide 214 holds the clips 24 with the posts 28, 30 oriented toward the chamber outlet 211.

The guide assembly 212 may further include a guide head 222 for engaging the one or more clips 24 disposed on the slide 214. The guide head 222 may also be shaped complementary to the slide 214 to permit the guide head 222 to translate longitudinally along the slide 214. The guide head 222 may further be configured to engage the clip 24 (or a trailing clip of a plurality of clips 24). A guide spring 224 may extend between the chamber base end 208 and a rear face of the guide head 222 to bias the guide head 222 toward the outlet end 210, which in turn biases the clip 24 also toward the outlet end 210.

Finally, the guide assembly 212 may include a guide post 226 for maintaining the guide head 222 on the slide 214 across the entire extent of travel of the guide head 222. In the illustrated embodiment, the guide post 226 extends from the base end 208 to a forward-most extent of travel of the guide head 222. The guide head 222 slidably receives the guide post 226, thereby to retain the guide head 222 in sliding engagement with the slide 214. The slide 214, guide head 222, guide spring 224, and guide post 226 may all have fixed positions relative to the base 202, so that the guide assembly 212 and base 202 both may be pivoted relative to the housing 204.

The composite laminate reinforcing tool 200 may further include a plunger assembly 230 for dispensing the clip 24 out of the chamber outlet 211. In the illustrated embodiment, the plunger assembly 230 includes a plunger head 232 disposed in the chamber 206 and positioned adjacent the chamber outlet end 210. The plunger head 232 is configured to engage a top surface 29 of the clip base 26, and is movable between a retracted position, in which the plunger head is disposed in the chamber 206 (FIG. 6), and an extended position, in which the plunger head 232 is disposed partially or entirely through the chamber outlet 211 to dispense the clip 24 (FIG. 8). The plunger head 232 may be manually actuated as shown in FIGS. 6-8, in which case the plunger assembly 230 may include a plunger rod 234, plunger handle 236, and plunger spring 238. The plunger handle 236 is disposed outside of the chamber 206 and is configured to receive a manual force 239 (represented by an arrow) sufficient to actuate the plunger head 232 between retracted and extended positions. The plunger spring 238 may be configured to automatically return the plunger head 232 to the retracted position as soon as the manual force 239 is removed. Alternatively, the plunger head 232 may be automatically actuated using a drive system (not shown).

The composite laminate reinforcing tool 200 also may include a heating assembly 240 thermally coupled to the plunger head 232. In the illustrated embodiment, the heating assembly 240 includes a heating element 242 disposed in the housing 204. A heating element wire 244 may extend from the heating element 242 to the plunger head 232, thereby to thermally couple the plunger head 232 to the heating element 242.

Figure 9:
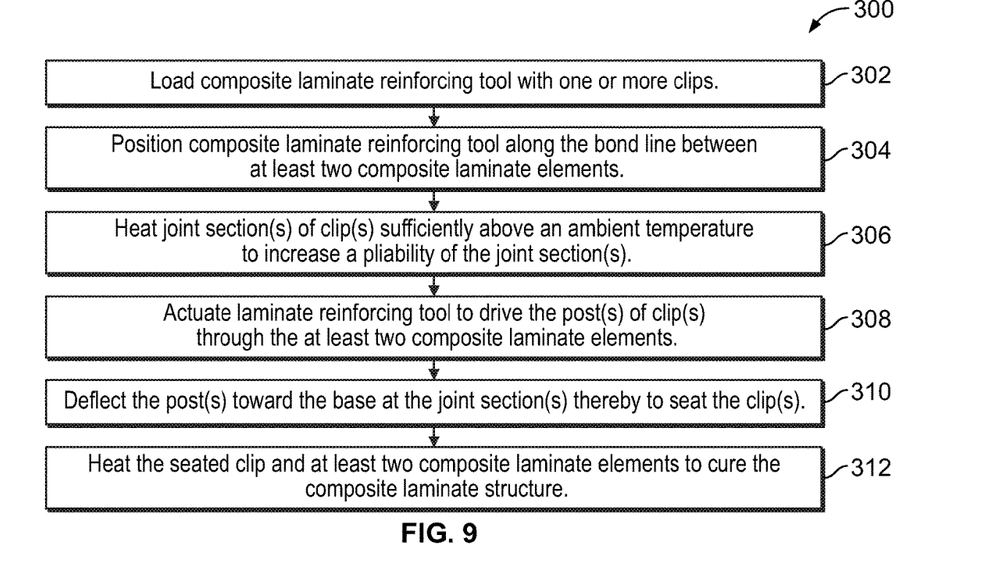
FIG. 9 is a flow chart illustrating a method for forming a reinforced joint of a composite laminate structure, in accordance with an advantageous embodiment.

The composite laminate reinforcing tool 200 may be used to perform a method for forming a reinforced joint at a bond line in a composite laminate structure 10, as illustrated by a flowchart 300 in FIG. 9. The method may begin at block 302, where the composite laminate reinforcing tool 200 is loaded with a clip 24 having at least one post 28 coupled to a base 26 at a joint section 32. The post 28 may extend at an initial angle α1 relative to the base 26. In some embodiments, the clip 24 may have a U-shape with first and second posts 28, 30 joined to the base at first and second joint sections 32, 34, with the first and second posts 28, 30 extending at first and second initial angles α1, α2 relative to the base 26.

Continuing at block 304, the composite laminate reinforcing tool 200 may be positioned along a bond line 20 or 22 between at least two composite laminate elements 12, 14. At block 306, the joint section 32 of the clip 24 may be heated sufficiently above an ambient temperature to increase a pliability of the joint section 32. The actual temperature to which the joint section 32 is heated depends on the type of clip material used. In some embodiments where the clip 24 includes two posts 28, 30, the heating step includes heating both first and second joint sections 32.

Next, the composite laminate reinforcing tool 200 may be actuated to dispense the clip 24, as indicated at block 308. During actuation of the tool 200, a plunger head 232 may be actuated from a retracted position (FIG. 6) to an extended position (FIG. 8). As the plunger head 232 advances to the extended position, the post 28 (or posts 28, 30) of the clip pierce through the composite laminate elements 12, 14.

At block 310, the post 28 is deflected toward the clip base 26 at the joint section 32 to seat the clip 24. The post 28 is deflected to a deflected angle β1 relative to the base 26, with the deflected angle β1 being different from the initial angle α1. In some embodiments having first and second posts 28, 30, this step includes deflecting the first and second posts 28, 30 at the first and second joint sections 32, 34 until the first and second posts 28, 30 extend at first and second deflected angles β1, β2 relative to the base 26. Both the first and second deflected angles β1, β2 may be different from the first and second initial angles α1, α2, respectively.

Deflection of the posts 28, 30 may be facilitated by the heating of the joint sections 32, 34 and the shape of the clips 24. For example, a backing surface 15 (FIGS. 1 and 2) may be positioned beneath the first and second composite laminate elements 12, 14 that engages the tips 36, 38 of the posts 28, 30 as they pierce through the elements 12, 14. The backing surface 15 may be provided as a lay-up tool or other structure having sufficient hardness to deflect the posts 28, 30. With the joint sections 32, 34 heated to increase pliability, the backing surface 15 will deflect the posts 28, 30. The tapered sections 50, 52 of the clips may be provided to more reliably deflect the posts 28, 30 inwardly toward the base 26.

The method described above may be advantageously used with one or more composite laminate elements that are either pre-impregnated with resin or dry fabric (i.e., not pre-impregnated with resin). If pre-impregnated laminates are used, the method may further include heating the seated clip 24 and the at least two composite laminate elements 12, 14 to cure the composite laminate structure 10. If dry fabric is used, an additional step of infusing resin into the dry fabric laminates may be performed prior to curing the composite laminate structure 10. An optional curing step is illustrated at block 312 in FIG. 9.

The above-described embodiments depict a composite laminate reinforcing tool and a method of reinforcing a composite laminate structure that may advantageously be used with a wide variety of composite laminate elements. The apparatus and methods disclosed herein provide an out-of-plane reinforcement for composite laminates that may be used with dry fabric resin infused laminates and/or pre-impregnated laminates. Once seated in the composite laminate elements, the clips provide mechanical locks along a bond line to provide out-of-plane reinforcement. As noted above, the clips may be installed with a manual or automated tool, and in some embodiments may include links between the clips to provide additional reinforcement.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, the different advantageous embodiments may be applied to other types of platforms. For example, without limitation, other advantageous embodiments may be applied to a submarine, a personnel carrier, a spacecraft, a surface ship, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite laminate reinforcing system for forming a reinforced joint at a bond line in a composite laminate structure comprising at least two composite laminate elements positioned over a backing surface, the system comprising:
   a plurality of clips, each of the plurality of clips comprising a base and a first post coupled to the base at a first joint section between the first post and the base, the first post extending at an initial angle relative to the base and defining a first post outer surface, facing away from the base and comprising an inwardly tapered section at a tip of the first post;
a tool, comprising:
a tool base;
a housing coupled to the tool base, the housing and tool base defining a chamber for receiving the plurality of clips, the chamber defining an outlet end;
a guide assembly disposed in the chamber and configured to hold the plurality of clips in a predetermined orientation and to bias the plurality of clips toward the outlet end of the chamber;
a plunger head disposed in the chamber adjacent the outlet end of the chamber, the plunger head positioned to engage the base of a leading clip of the plurality of clips, the plunger head being movable between a retracted position, in which the plunger head is disposed in the chamber, and an extended position, in which the plunger head passes through the outlet end of the chamber to dispense the leading clip; and
a heating element thermally coupled to the plunger head and configured to heat the first joint section sufficiently above an ambient temperature to increase a pliability of the first joint section, wherein as the plunger head moves to the extended position so that the first post pierces through the at least two composite laminate elements, the inwardly tapered section of the first post outer surface engages the backing surface to deflect the first post toward the base at the first joint section until the first post extends at a first deflected angle relative to the base.

2. The composite laminate reinforcing system of claim 1, further comprising a plunger handle coupled to the plunger head and disposed outside of the chamber, the plunger handle being configured to receive a manual force sufficient to actuate the plunger head between the retracted position and the extended position.

3. The composite laminate reinforcing system of claim 2, wherein the heating element is disposed in the housing and thermally coupled to the plunger head with a heating element wire.

4. The composite laminate reinforcing system of claim 2, wherein the guide assembly includes:
a slide disposed in the chamber and configured to receive the plurality of clips in the predetermined orientation;
a guide head positioned to engage a trailing clip of the plurality of clips; and
a guide spring operably coupled to the guide head and configured to bias the guide head toward the outlet end of the chamber.

5. The composite laminate reinforcing system of claim 2, wherein each of the plurality of clips is formed of a clip material selected from a group of clip materials consisting of uni-directional fiber reinforced thermoplastic, non-oriented chopped fiber reinforced thermoplastic, and neat thermoplastic resin.

6. The composite laminate reinforcing system of claim 1, wherein the heating element is disposed in the housing and thermally coupled to the plunger head with a heating element wire.

7. The composite laminate reinforcing system of claim 6, wherein the guide assembly includes:
a slide disposed in the chamber and configured to receive the plurality of clips in the predetermined orientation;
a guide head positioned to engage a trailing clip of the plurality of clips; and
a guide spring operably coupled to the guide head and configured to bias the guide head toward the outlet end of the chamber.

8. The composite laminate reinforcing system of claim 6, wherein each of the plurality of clips is formed of a clip material selected from a group of clip materials consisting of uni-directional fiber reinforced thermoplastic, non-oriented chopped fiber reinforced thermoplastic, and neat thermoplastic resin.

9. The composite laminate reinforcing system of claim 1, wherein the guide assembly includes:
a slide disposed in the chamber and configured to receive the plurality of clips in the predetermined orientation;
a guide head positioned to engage a trailing clip of the plurality of clips; and
a guide spring operably coupled to the guide head and configured to bias the guide head toward the outlet end of the chamber.

10. The composite laminate reinforcing system of claim 9, wherein each of the plurality of clips is formed of a clip material selected from a group of clip materials consisting of uni-directional fiber reinforced thermoplastic, non-oriented chopped fiber reinforced thermoplastic, and neat thermoplastic resin.

11. The composite laminate reinforcing system of claim 1, wherein each of the plurality of clips is formed of a clip material selected from a group of clip materials consisting of uni-directional fiber reinforced thermoplastic, non-oriented chopped fiber reinforced thermoplastic, and neat thermoplastic resin.

12. The composite laminate reinforcing system of claim 1, wherein:
each of the plurality of clips further comprises a second post, coupled to the base at a second joint section between the second post and the base, the second post extending at a second initial angle relative to the base and defining a second post outer surface, facing away from the base and comprising an inwardly tapered section at a tip of the second post; and
the heating element is further configured to heat the second joint section sufficiently above the ambient temperature to increase pliability of the second joint section, wherein as the plunger head moves to the extended position so that the second post pierces through the at least two composite laminate elements, the inwardly tapered section of the second post outer surface engages the backing surface to deflect the second post toward the base at the second joint section until the second post extends at a second deflected angle relative to the base.

13. The composite laminate reinforcing system of claim 1, wherein the plurality of clips further comprises a link, coupling each adjacent pair of clips of the plurality of clips.

14. The composite laminate reinforcing system of claim 1, wherein the initial angle is approximately 90 degrees.

15. A composite laminate reinforcing system for forming a reinforced joint at a bond line in a composite laminate structure comprising at least two composite laminate elements positioned over a backing surface, the system comprising:
a plurality of clips, each of the plurality of clips comprising a base, a first post coupled to the base at a first joint section between the first post and the base, and a second post coupled to the base at a second joint section between the second post and the base, the first post and the second post extending at first and second initial angles, respectively, relative to the base, the first and second initial angles being approximately 90 degrees so that each of the plurality of clips has a U-shape, the first post defining a first post outer surface, facing away from the base and comprising an inwardly tapered section at a tip of the first post, and the second post defining a second post outer surface, facing away from the base and comprising an inwardly tapered section at a tip of the second post;

a tool, comprising:
- a tool base;
- a housing coupled to the tool base, the housing and tool base defining a chamber for receiving the plurality of clips, the chamber defining an outlet end;
- a guide assembly disposed in the chamber and configured to hold the plurality of clips in a predetermined orientation and to bias the plurality of clips toward the outlet end of the chamber;
- a plunger head disposed in the chamber adjacent the outlet end of the chamber, the plunger head positioned to engage the base of a leading clip of the plurality of clips, the plunger head being movable between a retracted position, in which the plunger head is disposed in the chamber, and an extended position, in which the plunger head passes through the outlet end of the chamber to dispense the leading clip; and
- a heating element thermally coupled to the plunger head and configured to heat the first and second joint sections sufficiently above an ambient temperature to increase a pliability of the first and second joint sections, wherein as the plunger head moves to the extended position so that the first and second posts pierce through the at least two composite laminate elements, the inwardly tapered section of the first post outer surface and the inwardly tapered section of the second post outer surface engage the backing surface to deflect the first and second posts toward the base at the first and second joint sections, respectively, until the first and second posts extend at first and second deflected angles relative to the base.

16. The composite laminate reinforcing system of claim 15, further comprising a plunger handle coupled to the plunger head and disposed outside of the chamber, the plunger handle being configured to receive a manual force sufficient to actuate the plunger head between the retracted position and the extended position.

17. The composite laminate reinforcing system of claim 9, wherein the heating element is disposed in the housing and thermally coupled to the plunger head with a heating element wire.

18. The composite laminate reinforcing system of claim 15, wherein the guide assembly includes:
- a slide disposed in the chamber and configured to receive the plurality of clips in the predetermined orientation;
- a guide head positioned to engage a trailing clip of the plurality of clips; and
- a guide spring operably coupled to the guide head and configured to bias the guide head toward the outlet end of the chamber.

19. The composite laminate reinforcing system of claim 15, wherein each of the plurality of clips is formed of a clip material selected from a group of clip materials consisting of uni-directional fiber reinforced thermoplastic, non-oriented chopped fiber reinforced thermoplastic, and neat thermoplastic resin.

20. The composite laminate reinforcing system of claim 15, wherein the plurality of clips further comprises a link, coupling each adjacent pair of clips of the plurality of clips.

* * * * *

UNITED STATES PATENT AND TRADEMARK OFFICE
CERTIFICATE OF CORRECTION

PATENT NO. : 10,538,037 B2
APPLICATION NO. : 15/437680
DATED : January 21, 2020
INVENTOR(S) : Richard L. Kulesha It is certified that error appears in the above-identified patent and that said Letters Patent is hereby corrected as shown below:

In the Claims

Column 12, Line 12, delete the number "9" and substitute therefore -- 15 --.

Signed and Sealed this
Twelfth Day of May, 2020

Andrei Iancu
*Director of the United States Patent and Trademark Office*